United States Patent
Wei et al.

(10) Patent No.: US 8,650,224 B2
(45) Date of Patent: *Feb. 11, 2014

(54) BATCHING CONTENT MANAGEMENT OPERATIONS TO FACILITATE EFFICIENT DATABASE INTERACTIONS

(75) Inventors: Shu-Shang Sam Wei, Danville, CA (US); Roger W. Kilday, Livermore, CA (US); Victor Spivak, San Mateo, CA (US); Meir Amiel, Pleasanton, CA (US); David Buccola, Pleasanton, CA (US); Bryce Noland, Bellevue, CO (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/603,065

(22) Filed: Sep. 4, 2012

(65) Prior Publication Data

US 2012/0330917 A1    Dec. 27, 2012

Related U.S. Application Data

(63) Continuation of application No. 12/005,061, filed on Dec. 21, 2007, now Pat. No. 8,280,917.

(51) Int. Cl.
G06F 7/00    (2006.01)
G06F 17/30    (2006.01)

(52) U.S. Cl.
USPC .......................................... 707/802

(58) Field of Classification Search
USPC ............................... 707/802, 999.2
See application file for complete search history.

(56) References Cited

U.S. PATENT DOCUMENTS

| | | | |
|---|---|---|---|
| 5,870,760 A * | 2/1999 | Demers et al. | 1/1 |
| 2005/0262072 A1* | 11/2005 | Chen et al. | 707/4 |
| 2005/0289198 A1* | 12/2005 | Todd | 707/204 |

* cited by examiner

*Primary Examiner* — Aleksandr Kerzhner
(74) *Attorney, Agent, or Firm* — Van Pelt, Yi & James LLP

(57) ABSTRACT

Batching content management operations to facilitate efficient database interactions is disclosed. Two or more content management-related requests are received. The two or more content management-related requests are treated as a batch, including by formulating and sending to a database in a single database interaction a grouped request to add, delete, or modify each of a plurality of database records.

18 Claims, 7 Drawing Sheets

BATCHING CONTENT MANAGEMENT OPERATIONS TO FACILITATE EFFICIENT DATABASE INTERACTIONS

CROSS REFERENCE TO OTHER APPLICATIONS

This application is a continuation of U.S. patent application Ser. No. 12/005,061 (now issued as U.S. Pat. No. 8,280,917), entitled BATCHING CONTENT MANAGEMENT OPERATIONS TO FACILITATE EFFICIENT DATABASE INTERACTIONS filed Dec. 21, 2007 which is incorporated herein by reference for all purposes.

BACKGROUND OF THE INVENTION

Content management solutions facilitate the creation, storage, retrieval, promotion (e.g., through a review/approval and/or other business process or work flow), retention, migration, and/or destruction of content, typically in the context of a relatively large body of content. A wide variety of regulatory and other legal and/or business requirements prescribe a manner and/or duration of retention of certain content. In some environments, large volumes of similar content objects, e.g., email messages or other communications, ecommerce or other transaction records, stock quotes, etc. must be ingested relatively quickly into a content management system. A content management system typically uses a database, such as a relational database management system (RDBMS), to store metadata associated with content items (e.g., documents or other files or objects) under management of the content management system. In a typical content management system, for each such content item that is added to a body of content being managed by the content management system one or more objects must be created and/or associated data stored (or updated) in a database, which typically results in one or more database interactions being performed for each content item that is ingested. Other common and/or repetitive interactions by a client and/or application with a typical content management system similarly can result in inefficient interactions with the database. In a typical content management system, some efficiency may be attained by associating related operations together into a single database "transaction", but even then some inefficiency remains, e.g., the RDBMS typically inserts (or updates) each row individually, resulting in more network transfers and processing overhead.

BRIEF DESCRIPTION OF THE DRAWINGS

Various embodiments of the invention are disclosed in the following detailed description and the accompanying drawings.

DETAILED DESCRIPTION

Figure 1:
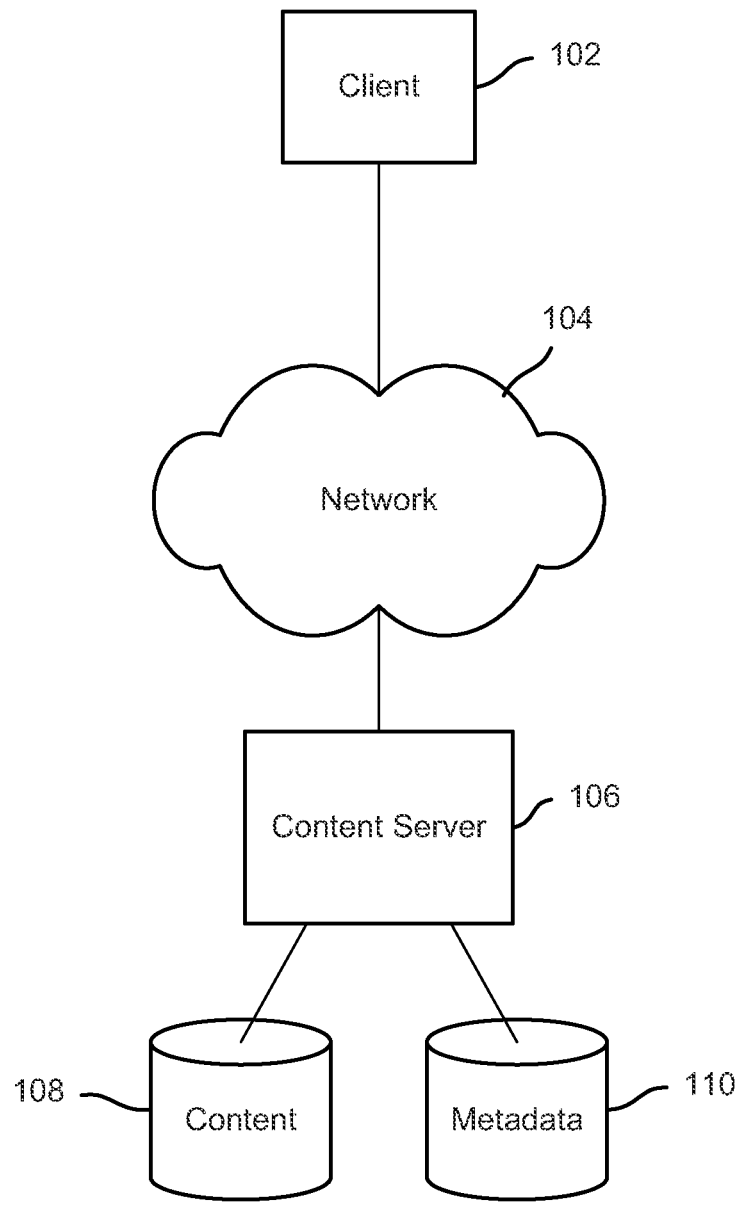
FIG. 1 is a block diagram illustrating an embodiment of a content management system.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Batching content management operations to facilitate efficient database interactions is disclosed. In some embodiments, a group of related content management commands or operations are processed by a content management system as a batch. For example, rather than performing each requested operation in series, and interacting separately with a database for each content management operation that requires database interaction, related (also referred to herein as "batched") operations and/or associated database interactions are performed collectively. For example, in some embodiments a series of successive content management operations, such as creating and storing for each of a series of content items being ingested into a body of managed content a corresponding object to represent the content item (e.g., in a body of metadata) are treated as a group or "batch". For example, under prior approaches data comprising each object may be sent to the database in an associated "save" or other database command or interaction. In at least some prior systems, some efficiency may be achieved by grouping multiple such save operations into a single database transaction, which lowers database overhead by allowing the database to wait until all the database commands associated with the transaction have been received before "committing" changes to the database. However, even if multiple successive and/or repetitive commands are included in a single database transaction, the RDBMS typically inserts (or updates) each row individually, resulting in more network transfers and processing overhead. Using the batching technique disclosed herein, in some embodiments multiple updates are gathered by the content management system and handed to the database in a single database interaction, which enables the database to update multiple rows in a single operation, further reducing overhead.

In some embodiments, an API or other interface is provided that enables an application or other process to "batch" content management commands, for example by providing an explicit indication to "begin batch" and "end batch". In some embodiments, an indication to begin/end a batch is implicit in other actions or events, e.g., commands indicated as being part of a single database transaction in some embodiments may also be treated as comprising a batch of content management commands.

In some embodiments, if content management commands and/or operations are included in a batch a requesting application, process, user, or other entity must expect that associated data may not be reflected in the database until the entire batch has been processed. In some embodiments, the content management system may, but will not necessarily, update the database prior to receiving an indication that an end of a batch has been reached. For example, other criteria (insufficient memory, interdependencies, caching policies, etc.) may result in content management commands being performed and/or reflected in the database prior to the end of a batch being indicated and/or reached.

FIG. 1 is a block diagram illustrating an embodiment of a content management system. One more clients 102 connect via a network 104 to a content server 106 configured to manage and provide access to body of content stored in a content store 108. For each content item in content store 108, corresponding metadata is stored in a metadata store 110. In some embodiments, each content item in content store 108 is represented in metadata stored in metadata store 110 by one or more objects configured to provide content management related functionality with respect to the content item. Data comprising each metadata object is stored in some embodiments in one or more database table, e.g., in a relational database management system (RDBMS). In some embodiments a content management client on client 102 communicates with content server 106 via network 104 to make content management related services available to applications running on client 102. In some embodiments, client applications on client 102 use a content management framework associated with the content management client to access content management related services. For example, such a client application may be configured to store a new content item (e.g., a document or other object) by invoking the content management client (or the server 106 directly) to create and save a new object, e.g., a new object configured and/or usable to save in content store 108 content data comprising the content item and/or to represent the content item in metadata 110. Similarly, to retrieve data, a client application and/or content management client would communicate with content server 106 via network 104. The client 102 may provide, for example, an identifier associated with a particular content item and/or one or more search criteria, such as a query to search for items created by a particular author on a specified date. In the case of retrieval of a specified content item, the content server 106 would use the provided identifier to retrieve the content item from the content store 108 and provide it to the client 102 via network 104. In the case of a query, the content server 106 would query database 110 to identify responsive objects. In some embodiments, metadata associated with responsive objects is sent via network 104 to client 102 where a user and/or process may select one or more responsive objects for retrieval.

In some environments, a very large number of similar content management operations may be required to be performed in a very short period of time. For example, emails or other messages may be required to be archived as they are generated, sent, and/or received, e.g., in a large enterprise environment. Or, a preexisting body of content may be required to be imported into a content management system. In such cases, a client application or other process on client 102 typically would be configured to process content items serially, potentially invoking over and over again the same content management system commands and/or operations.

Figure 2:
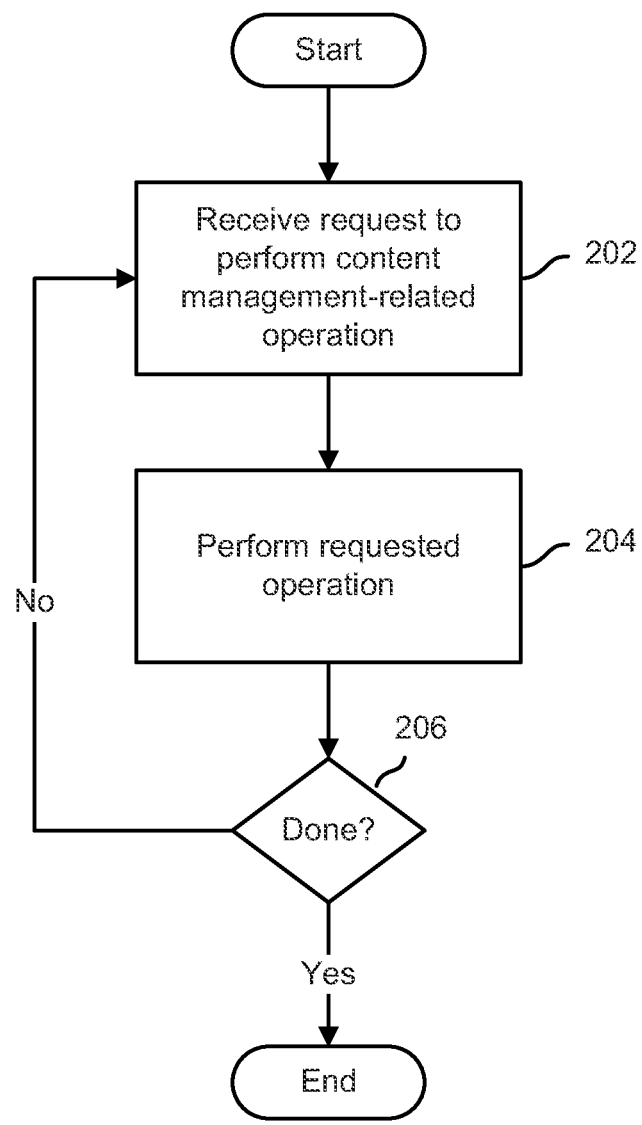
FIG. 2 is a flow chart illustrating an embodiment of a prior art process for performing content management commands and/or operations.

FIG. 2 is a flow chart illustrating an embodiment of a prior art process for performing content management commands and/or operations. In the example shown, each content management-related operation is performed as it is received (202 and 204) until all requested operations have been performed (206).

Batching content-management related commands and/or operations is disclosed. In some embodiments, batched commands and/or operations will not necessarily (but may) be reflected in an applicable database, e.g., content store 108 and/or metadata store 110, until an end of the batch is reached and/or indicated. In some embodiments, an indication is provided by a requesting entity that one or more content management-related operations and/or commands may be treated as a related batch of operations. In some embodiments, commands and/or operations may be batched based on some criterion other than an explicit indication from a requesting entity, e.g., to coincide with database transaction boundaries (as indicated by a requesting entity or otherwise) and/or based on other events and/or indications. In some embodiments, a requesting entity (e.g., a client application) understands that changes associated with batched commands and/or operations may not be reflected in an applicable database until an end of the batch is reached and/or indicated. For example, to improve efficiency in interacting with a database such as metadata store 110 the content management system (e.g., content server 106) may queue commands and/or operations to be able to optimize database interactions by treating the batched operations as a group. For example, instead of sending to the database a thousand successive requests, each request requesting insertion of a new row corresponding to a new object, the content server may in a single interaction with the database request insertion of all one thousand rows.

Figure 3:
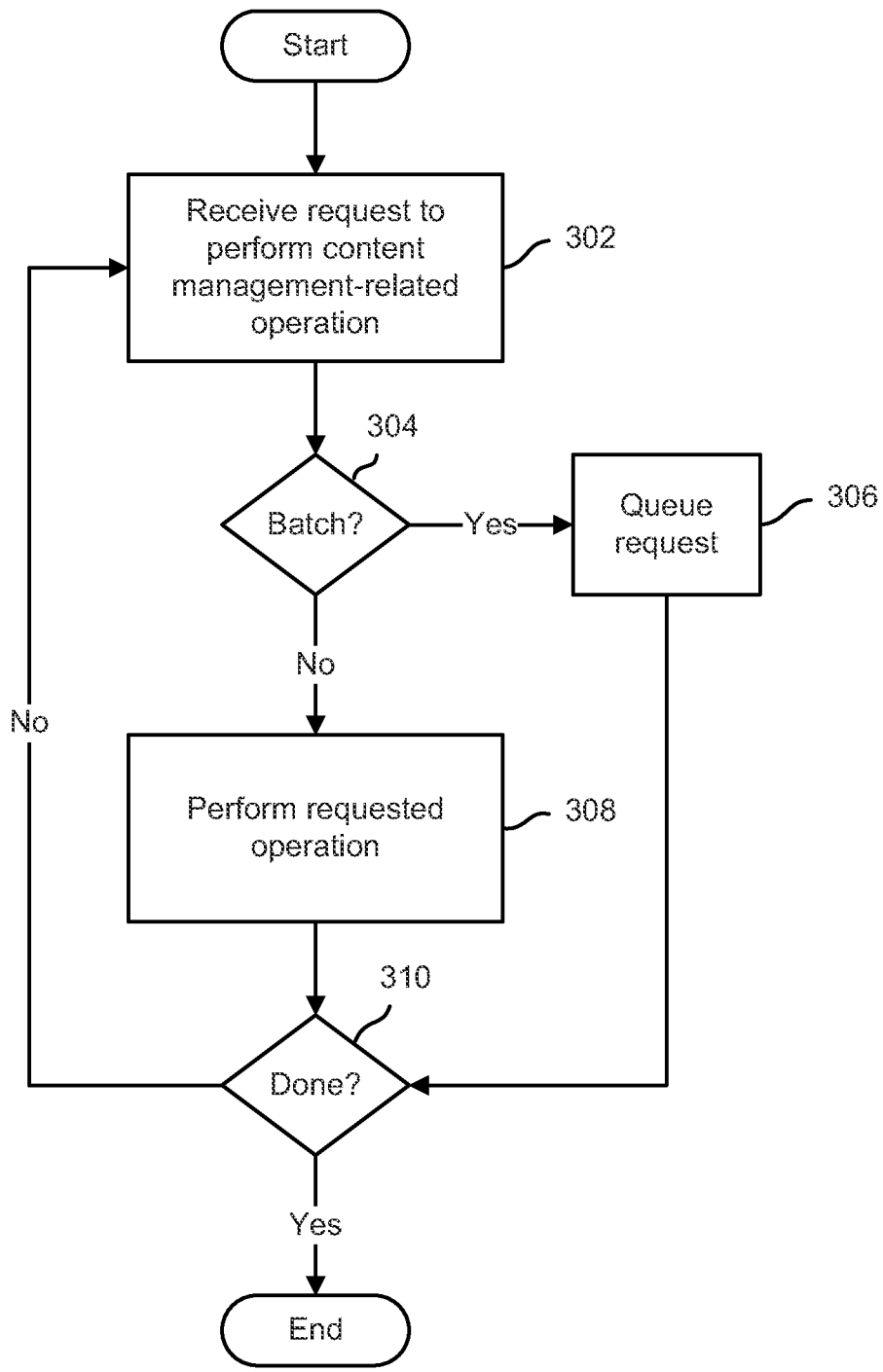
FIG. 3 is a flow chart illustrating an embodiment of a process for batching content management commands and/or operations.

FIG. 3 is a flow chart illustrating an embodiment of a process for batching content management commands and/or operations. In the example shown, a request to perform a content management-related operation (e.g., a command) is received (302). If the request is part of a batch (304) it is place in a queue, for example with one or more other requests in the batch. Otherwise, it is performed (308). Subsequent iterations of steps 302-308, as applicable, are repeated as/if subsequent requests are received (310).

In some embodiments, the beginning and ending of a batch is or may be indicated explicitly by a requesting entity, such as a client application. For example, a client application desiring to have a plurality of objects 1 to n created and save in succession, in some embodiments the client application would indicate to the content management system that the operations may and/or should be treated as a batch using syntax such as the following:

```
begin batch
    create object 1
    save object 1
    create object 2
    save object 2
    ...
    create object n
    save object n
end batch
```

Figure 4:
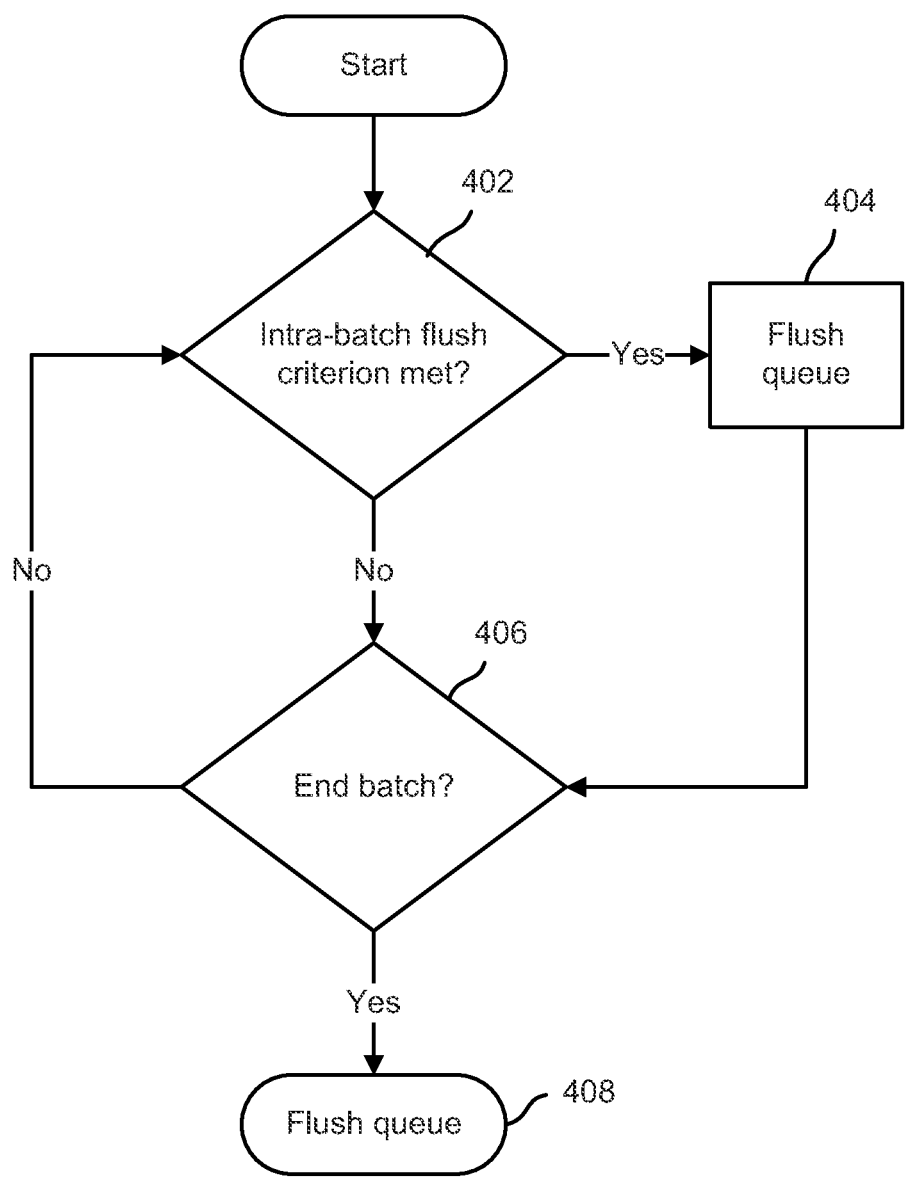
FIG. 4 is a flow chart illustrating an embodiment of a process for performing batched content management operations.

FIG. 4 is a flow chart illustrating an embodiment of a process for performing batched content management operations. In the example shown, batched operations are performed, e.g., as a group, upon receipt of an indication that an intra-batch "flush" criterion has been met (402 and 404) and/or upon receipt of an indication that an end of the batch has been indicated and/or reached (406 and 408). Examples of an intra-batch flush criterion include an indication that a query or other request implicating one or more objects that are and/or may be affected by a command in the batch queue, other dependencies on objects in the queue, and approaching a state in which memory available to queue batched commands is full. The example shown in FIG. 4 illustrates that in some embodiments previously received batched operations may be performed prior to an end of the batch being indicated and/or received. In such embodiments, a requesting entity that sent the batched requests and indicating that they should be treated as a batch must be configured to assume that the operations will not necessarily, but may (e.g., if the determination in 402 is affirmative), be reflected in an applicable database.

Figure 5:
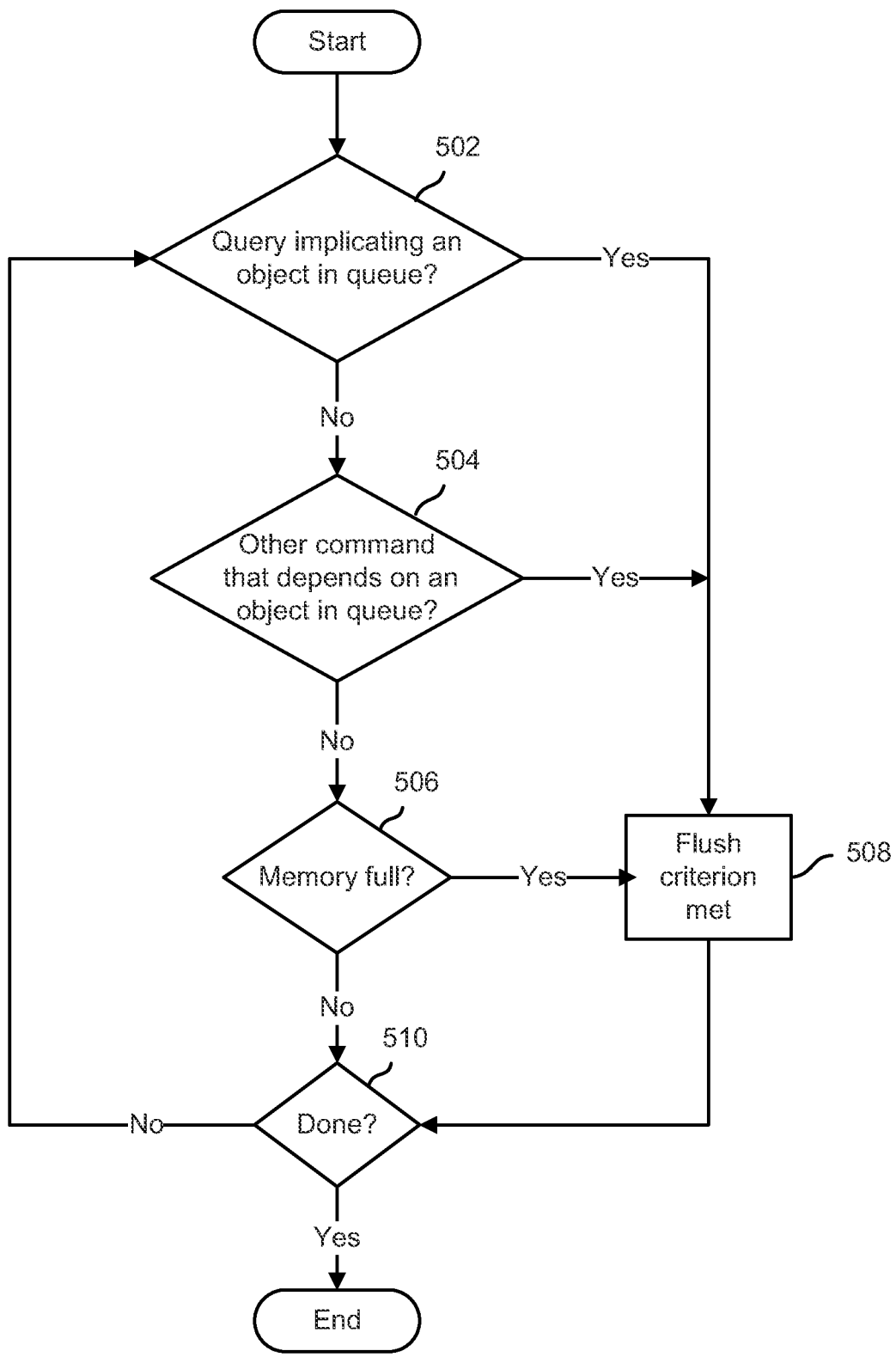
FIG. 5 is a flow chart illustrating an embodiment of a process for determining whether an intra-batch flush criterion has been met.

FIG. 5 is a flow chart illustrating an embodiment of a process for determining whether an intra-batch flush criterion has been met. In some embodiments, the process of FIG. 5 is used to implement 402 of FIG. 4. Upon receiving a query implicating an object affected by a batched command and/or operation that has not yet been performed (502); another command that depends on an objected affected by such a command and/or operation (504), for example from a process or other entity other than one that requested the batched command and/or operation; or an indication that a memory used to queue batched commands and/or requests is full (506), it is concluded that an intra-batch flush criterion has been met (508). The process continues until an end of the batch is reached (510).

Figure 6:
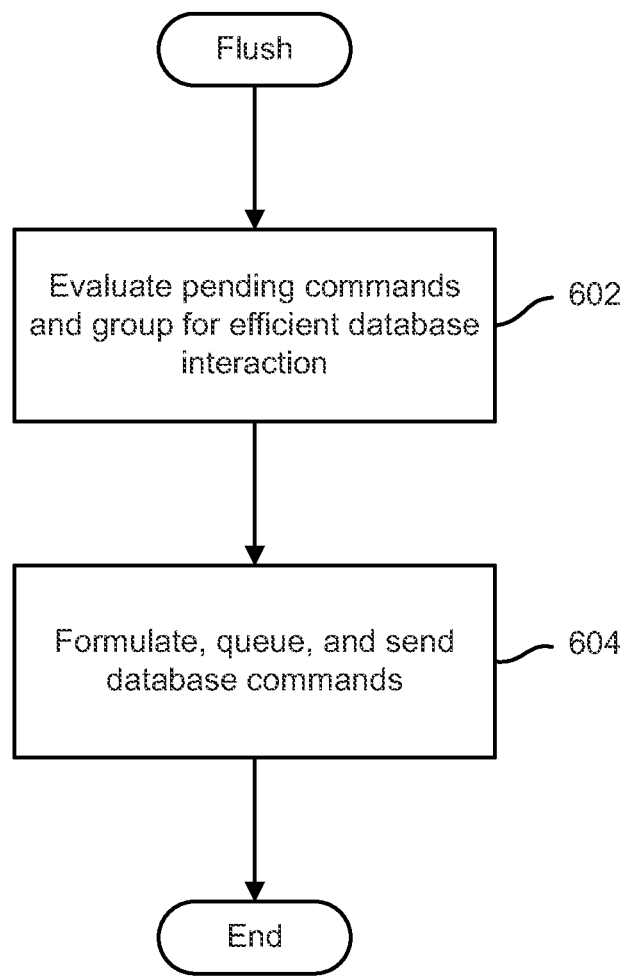
FIG. 6 is a flow chart illustrating an embodiment of a process for flushing a queue of batched content management-related commands and/or operations.

FIG. 6 is a flow chart illustrating an embodiment of a process for flushing a queue of batched content management-related commands and/or operations. In some embodiments, the process of FIG. 6 is used to implement 404 and 408 of FIG. 4. To flush the queue, pending commands are evaluated and grouped for efficient database interaction (602). For example, a set of paired commands to "create" and "save" objects associated with content items being added to a body of managed content may be identified to be performed at the content server and corresponding database requests, for example to insert for each new object a corresponding row in an associated database table, sent to the database as a group. Associated database commands and/or requests are formulated, queued, and sent to the database (604) in accordance with the determination at 602.

Figure 7:
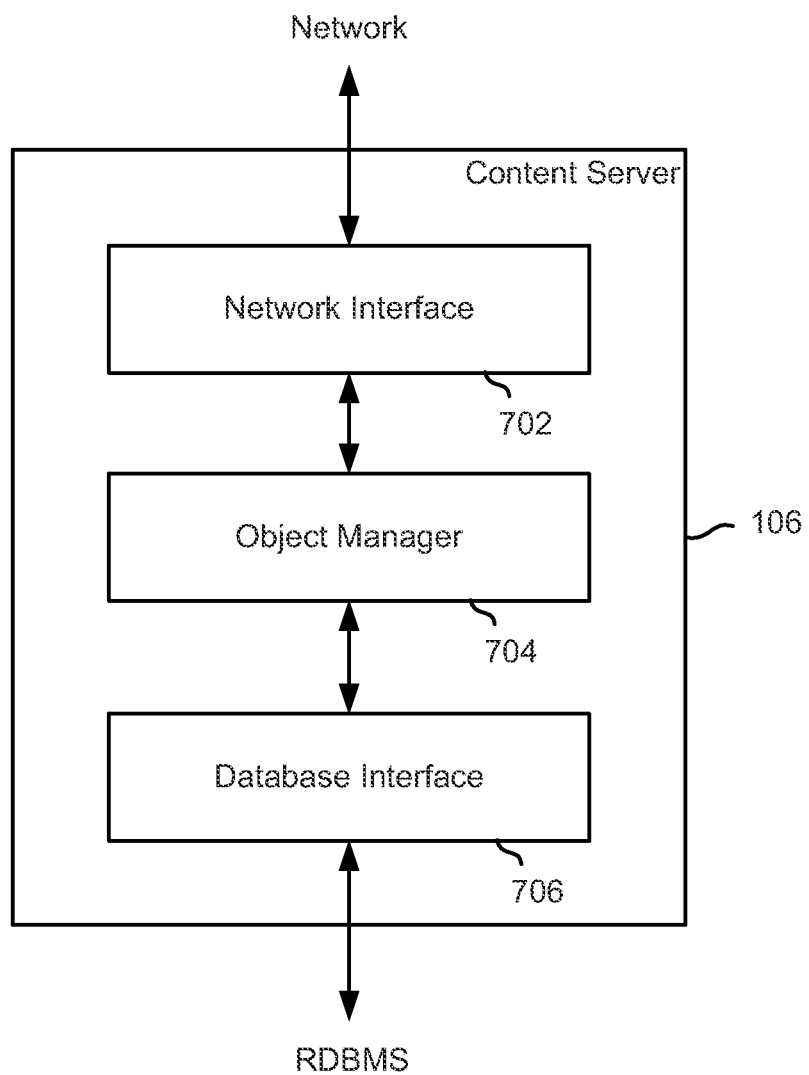
FIG. 7 is a block diagram illustrating an embodiment of a content management system configured to batch content management-related commands and/or operations.

FIG. 7 is a block diagram illustrating an embodiment of a content management system configured to batch content management-related commands and/or operations. In the example shown, content server 106 includes a network interface 702 used to communicate with clients such as client 102 via a network such as network 104. The content server 106 also includes an object manager 704 configured to manage objects created, accessed, and/or otherwise used by requesting clients and/or internal processes. The object manager 704 communicates with clients via the network interface 702, e.g., to receive content data, content management-related commands, etc. and conversely to send requested data and/or information responsive to requests, such as query results. The object manager 704 is configured to interact via a database interface 706 with one or more relational database management systems (RDBMS), e.g., to add or modify data to/in a content store such as content store 108 and/or a metadata store such as metadata store 110. In various embodiments, one or more of the object manager 704 and/or the database interface 706 is/are configured to support batching of content management-related commands and/or operations as disclosed herein, for example by implementing all or part of one or more of the processes of FIGS. 3-6.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for managing stored content, comprising:
receiving and storing two or more content management-related requests originally assigned to be processed together as part of a batch, wherein a batch of content management-related requests comprises requests that are sent to a database before a change to the database corresponding to the requests is committed;
after receiving the two or more content management-related requests, receiving an additional content management-related request originally assigned to be processed together with the two or more content management-related requests as part of the batch;
using a processor to determine whether the received additional content management-related request has a dependency upon at least one of the stored content management-related requests; and
in response to determining that the received additional content management-related request has a dependency upon at least one of the stored content management-related requests, processing only the two or more content management-related requests together as the batch, comprising:
performing the two or more content management-related stored requests as the batch, including by formulating and sending to the database in a single database interaction a grouped request to add, delete, or modify database records of the database; and
delaying to perform the additional content management-related request and any later content management-related requests after the two or more content management-related requests are performed.

2. The method of claim 1, further comprising receiving from a requesting entity with which the two or more content management-related requests are associated an indication that the two or more content management-related requests are associated.

3. The method of claim 2, wherein the indication comprises an explicit indication that the two or more content management-related requests comprise a batch.

4. The method of claim 1, wherein processing only the two or more content management-related requests together as the batch is performed in the event it is determined to flush the stored content management-related requests even if an end of the batch has not been reached or indicated.

5. The method of claim 1, further comprising:
using a processor to determine whether a query is received, wherein the query implicates an object that is affected by an as yet unperformed stored request; and
in response to receiving the query, processing only the two or more content management-related requests together as the batch.

6. The method of claim 1, further comprising:
using a processor to determine whether an indication that a memory being used to store the content management-related requests is full or nearly full; and
in response to receiving the indication, processing only the two or more content management-related requests together as the batch.

7. A content management system, comprising:
a communication interface configured to receive two or more content management-related requests originally assigned to be processed together as part of a batch, wherein a batch of content management-related requests comprises requests that are sent to a database before a change to the database corresponding to the requests is committed; and
a processor configured to:
store the received content management-related requests;
after receiving the two or more content management-related requests, receive an additional content management-related request originally assigned to be processed together with the two or more content management-related requests as part of the batch;
determine whether the received additional content management-related request has a dependency upon at least one of the content management-related stored requests; and
in response to determining that the received additional content management-related request has a dependency upon at least one of the stored content management-related requests, process only the two or more content management-related requests together as the batch, comprising:
perform the two or more content management-related requests as the batch, including by formulating and sending to the database in a single database interaction a grouped request to add, delete, or modify f database records of the database; and
delay to perform the additional content management-related request and any later content management-related requests after the two or more content management-related requests are performed.

8. The content management system of claim 7, wherein the processor is further configured to receive from a requesting entity with which the two or more content management-related requests are associated an indication that the two or more content management-related requests are associated.

9. The content management system of claim 8, wherein the indication comprises an explicit indication that the two or more content management-related requests comprise a batch.

10. The content management system of claim 7, wherein treating the two or more content management-related requests as a batch is performed in the event it is determined to flush the stored content management-related requests even if an end of the batch has not been reached or indicated.

11. The content management system of claim 7, wherein the processor is further configured to:
determine whether a query is received, wherein the query implicates an object that is affected by an as yet unperformed stored request; and
in response to receiving the query, process only the two or more content management-related requests together as the batch.

12. The content management system of claim 7, wherein the processor is further configured to:
determine whether an indication that a memory being used to store the content management-related requests is full or nearly full; and
in response to receiving the indication, process only the two or more content management-related requests together as the batch.

13. A computer program product for managing stored content, the computer program product being embodied in a non-transitory computer readable storage medium and comprising computer instructions for:
receiving and storing two or more content management-related requests originally assigned to be processed together as part of a batch, wherein a batch of content management-related requests comprises requests that are sent to a database before a change to the database corresponding to the requests is committed;
after receiving the two or more content management-related requests, receiving an additional content management-related request originally assigned to be processed together with the two or more content management-related requests as part of the batch;
determining whether the received additional content management-related request has a dependency upon at least one of the stored content management-related requests; and
in response to determining that the received additional content management-related request has a dependency upon at least one of the stored content management-related requests, processing only the two or more content management-related requests together as the batch, comprising:
performing the two or more content management-related requests as the batch, including by formulating and sending to the database in a single database interaction a grouped request to add, delete, or modify database records of the database; and
delaying to perform the additional content management-related request and any later content management-related requests after the two or more content management-related requests are performed.

14. The computer program product recited in claim 13, further comprising computer instructions for receiving from a requesting entity with which the two or more content management-related requests are associated an indication that the two or more content management-related requests are associated.

15. The computer program product recited in claim 14, wherein the indication comprises an explicit indication that the two or more content management-related requests comprise a batch.

16. The computer program product of claim 13, wherein treating the two or more content management-related requests as a batch is performed in the event it is determined to flush the stored content management-related requests even if an end of the batch has not been reached or indicated.

17. The computer program product of claim 13, further comprising computer instructions for:
determining whether a query is received, wherein the query implicates an object that is affected by an as yet unperformed stored request; and in response to receiving the query, processing only the two or more content management-related requests together as the batch.

18. The computer program product of claim 13, further comprising computer instructions for:
 determining whether an indication that a memory being used to store the content management-related requests is full or nearly full; and
 in response to receiving the indication, processing only the two or more content management-related requests together as the batch.

* * * * *